United States Patent
Fattu et al.

(10) Patent No.: US 10,749,758 B2
(45) Date of Patent: Aug. 18, 2020

(54) COGNITIVE DATA CENTER MANAGEMENT

(71) Applicant: INTERNATIONAL BUSINESS MACHINES CORPORATION, Armonk, NY (US)

(72) Inventors: Khajistha Fattu, Austin, TX (US); Michael Fattu, Austin, TX (US); Prasanna Jayaraman, Austin, TX (US); Tony Sawan, Round Rock, TX (US); Eakambaram R. Thirumalai, Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 79 days.

(21) Appl. No.: 16/197,935

(22) Filed: Nov. 21, 2018

(65) Prior Publication Data

US 2020/0162342 A1 May 21, 2020

(51) Int. Cl.
*G06F 15/16* (2006.01)
*H04L 12/24* (2006.01)
*H04L 12/26* (2006.01)

(52) U.S. Cl.
CPC .......... *H04L 41/16* (2013.01); *H04L 43/0817* (2013.01); *H04L 43/16* (2013.01)

(58) Field of Classification Search
CPC ...... H04L 41/16; H04L 43/0817; H04L 43/16
See application file for complete search history.

(56) References Cited

U.S. PATENT DOCUMENTS

| | | |
|---|---|---|
| 5,793,648 A | 8/1998 | Nagle et al. |
| 6,359,433 B1 | 3/2002 | Gillis et al. |

(Continued)

OTHER PUBLICATIONS

Botezatu et al., Predicting Disk Replacement towards Reliable Data Centers, KDD '16 Proceedings of the 22nd ACM SIGKDD International Conference on Knowledge Discovery and Data Mining, Aug. 2016, pp. 39-48.

(Continued)

*Primary Examiner* — Moustafa M Meky
(74) *Attorney, Agent, or Firm* — Kunzler Bean & Adamson; Bruce R. Needham

(57) ABSTRACT

An apparatus for cognitive data center management is disclosed. A computer-implemented method and computer program product also perform the functions of the apparatus. According to an embodiment of the present invention, the apparatus includes a performance module that determines performance metrics over a predetermined time interval at a device coordinate in a three-dimensional ("3D") coordinate system for each replaceable device of a plurality of replaceable devices within a data center. The apparatus maps the performance metrics to environmental sensor measurements taken in the 3D coordinate system. The apparatus further includes an input analysis module that uses discovery analytics to determine a predicted time to failure for each replaceable device. The apparatus further includes a preventative action module that determines recommended actions to prevent failure of the replaceable devices and a tradeoff learning module that provides updated weighting factors based on changes to performance metrics in response to taking recommended actions.

20 Claims, 7 Drawing Sheets

(56) References Cited

U.S. PATENT DOCUMENTS

| | | | |
|---|---|---|---|
| 6,564,112 | B1 | 5/2003 | Factor |
| 6,771,440 | B2 | 8/2004 | Smith |
| 6,980,381 | B2 | 12/2005 | Gray |
| 7,000,460 | B1 | 2/2006 | Cline et al. |
| 8,417,774 | B2 | 4/2013 | Flynn et al. |
| 9,026,409 | B2 | 5/2015 | Schmidtke et al. |
| 9,536,194 | B2 | 1/2017 | Cao et al. |
| 9,566,986 | B1 | 2/2017 | Gordon et al. |
| 9,646,495 | B2 * | 5/2017 | Barnett .................. G08G 1/048 |
| 2003/0046382 | A1 * | 3/2003 | Nick ........................ G05B 9/02 709/224 |
| 2005/0080502 | A1 | 4/2005 | Chernyak et al. |
| 2009/0161243 | A1 | 6/2009 | Sharma et al. |
| 2012/0278810 | A1 | 11/2012 | Dawson et al. |
| 2015/0339919 | A1 * | 11/2015 | Barnett ................ G08G 1/0133 340/907 |
| 2016/0277260 | A1 | 9/2016 | Griffith et al. |
| 2019/0074990 | A1 * | 3/2019 | Reimer .................. G08B 29/20 |

OTHER PUBLICATIONS

Pinheiro et al., Failure Trends in a Large Disk Drive Population, Appears in the Proceedings of the 5th USENIX Conference on File and Storage Technologies (FAST'07), Feb. 2007, pp. 1-13.

Murray et al., Hard drive failure prediction using non-parametric statistical methods, Proc. ICANN/ICONIP, 2003, pp. 1-4.

Beach, Brian, Hard Drive Smart Stats, https://www.backblaze.com/blog/hard-drive-smart-stats/, last visited on Nov. 20, 2018.

Prophecy Unleashes Technology 4.0, Prophecy Sensorlytics, https://web.archive.org/web/20150926014803/http:/www.prophecysensor.com:80/our-technology, 2015, Last visited Oct. 1, 2018.

Power Quality Analyzer, MachineSense, https://machinesense.com/pages/power-quality-analyzer, Oct. 1, 2018.

The Data Science of Predicting Disk Drive Failures, Direct2DellEMC, https://blog.dellmc.com/en-us/data-science-predicting-disk-drive-failures/, Sep. 17, 2018.

Knowledge Center Predictive Maintenance Sensorlytics, Whitepaper: Plastics Technology, https://web.archive.org/web/20170629231831/http:/www.ptonline.com/knowledgecenter/predictive-maintenance-sensorlytics/Whitepapers, Oct. 1, 2018.

* cited by examiner

COGNITIVE DATA CENTER MANAGEMENT

BACKGROUND

The subject matter disclosed herein relates to cognitive data center management and more particularly relates to a system, apparatus, and method for data center management through predictive failure analysis and machine learning.

Data centers process and store large amounts of data on an ongoing basis. Data center infrastructure typically includes multiple rows of IT equipment racks for server nodes, storage enclosures, and other IT equipment. Data centers include power systems that provide power to the IT equipment racks. Cooling systems within the data centers provide cooling flows of air that pass through spaces that separate the rows of IT equipment racks. Managing data centers sometimes requires replacement of devices in the IT equipment due to failure of the devices. Data center management also includes management of power and cooling systems. Data center management further includes management of IT workload and performance. Some data center management tools detect imminent failure of devices at a point in time when repairing or replacing the devices interrupts data center operations.

SUMMARY

An apparatus for cognitive data center management is disclosed. A computer-implemented method and computer program product also perform the functions of the apparatus. According to an embodiment of the present invention, the apparatus includes a performance module that determines performance metrics over a predetermined time interval at a device coordinate in a three-dimensional ("3D") coordinate system for each replaceable device of a plurality of replaceable devices within a data center. The apparatus includes a mapping module that maps the performance metrics to environmental measurements taken in the predetermined time interval at sensor coordinates in the 3D coordinate system. The apparatus further includes an input analysis module that uses machine learning with discovery analysis to determine a predicted time to failure for each replaceable device of the plurality of replaceable devices based on baseline correlations of the performance metrics and the device coordinate for each of the plurality of replaceable devices, and the environmental measurements captured at the sensor coordinates.

In the embodiment, the apparatus a factor weighting module that assigns a weighting factor to each environmental measurement ("weighted environmental measurement") and each performance metric ("weighted performance metric"). A preventative action module is also included in the apparatus. The preventative action module communicates a ranked set of recommended actions for mitigating a predicted failure of one or more of the replaceable devices, the failure predicted based on a comparison between current weighted performance and environmental measurements and the baseline correlations. According to the embodiment, the modules comprise one or more of hardware circuits, a programmable hardware device and executable code, the executable code stored on one or more computer readable storage media.

According to some embodiments, a computer-implemented method for cognitive data center management includes determining performance metrics over a predetermined time interval at a device coordinate in a three-dimensional ("3D") coordinate system for each replaceable device of a plurality of replaceable devices within a data center. The method further includes mapping the performance metrics to environmental measurements taken in the predetermined time interval at sensor coordinates in the 3D coordinate system. The method includes using discovery analytics with machine learning to determine a predicted time to failure for each replaceable device of the plurality of replaceable devices based on baseline correlations of the performance metrics and the device coordinate for each of the plurality of replaceable devices, and the environmental measurements captured at the sensor coordinates. In the embodiment, the method includes assigning a weighting factor to each environmental measurement ("weighted environmental measurement") and each performance metric ("weighted performance metric"). The method further includes communicating to an administrator, a ranked set of recommended actions for mitigating a predicted failure of one or more of the replaceable devices, the failure predicted based on a comparison of current weighted performance and environmental measurements with the baseline correlations.

According to some embodiments, a computer program product for cognitive data center management includes a computer readable storage medium having program instructions embodied therewith, the program instructions executable by a processor to cause the processor to implement the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
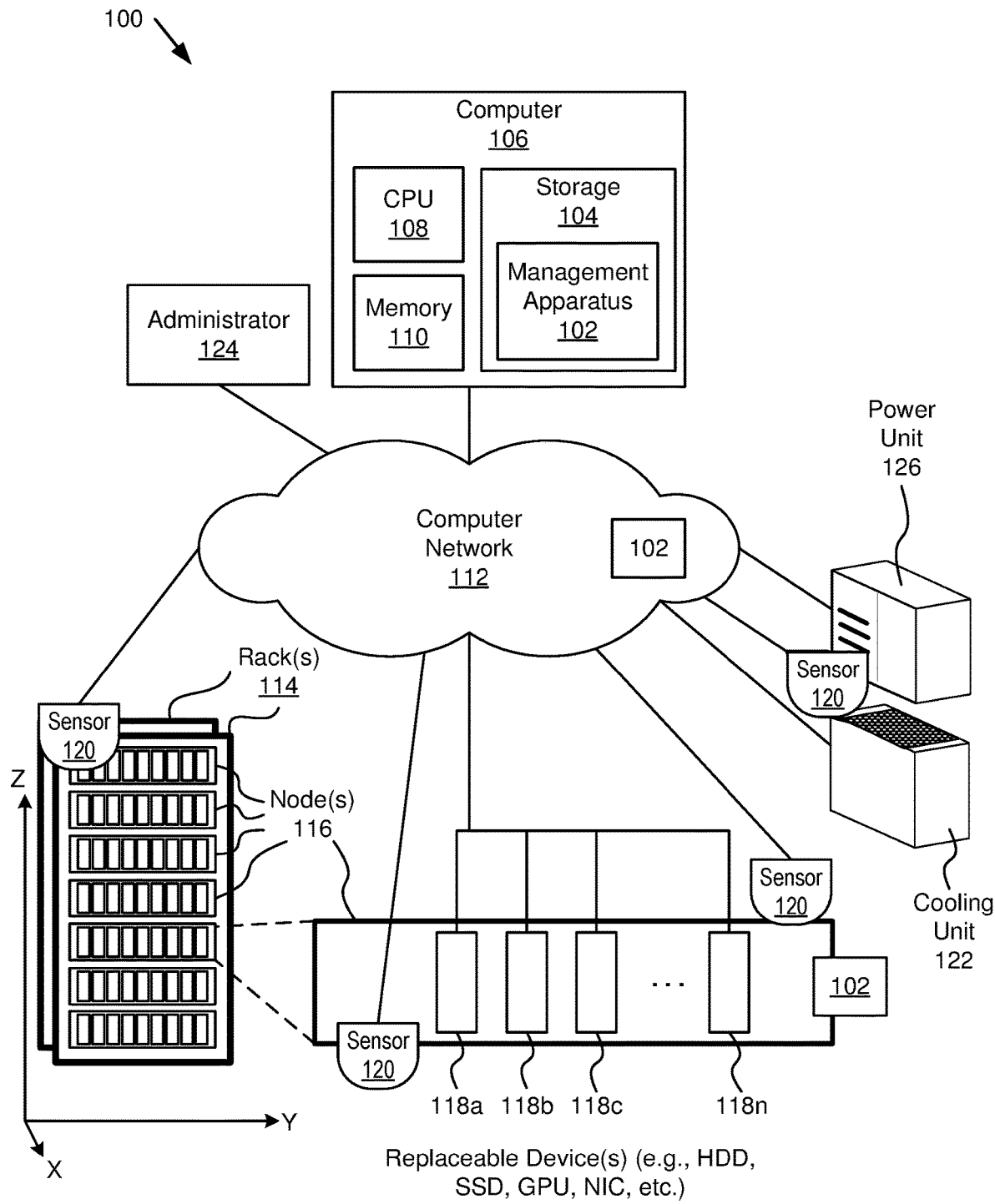
FIG. 1 is a schematic block diagram illustrating one embodiment of a system for cognitive data center management in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures Like numbers refer to like elements in all figures, including alternate embodiments of like elements.

According to an embodiment of the present invention, an apparatus for cognitive data center management includes a performance module that determines performance metrics over a predetermined time interval at a device coordinate in a three-dimensional ("3D") coordinate system for each replaceable device of a plurality of replaceable devices within a data center. The apparatus includes, in one embodiment, a mapping module that maps the performance metrics to environmental measurements taken in the predetermined time interval at sensor coordinates in the 3D coordinate system.

In some embodiments, the apparatus includes an input analysis module that uses discovery analytics to determine a predicted time to failure for each replaceable device of the plurality of replaceable devices based on baseline correlations of the performance metrics and the device coordinate for each of the plurality of replaceable devices, and the environmental measurements captured at the sensor coordinates.

In certain embodiments, the apparatus includes a factor weighting module that assigns a weighting factor to each environmental measurement ("weighted environmental measurement") and each performance metric ("weighted performance metric"). In some embodiments, the apparatus includes a preventative action module that communicates a ranked set of recommended actions for mitigating a predicted failure of one or more of the replaceable devices, the failure predicted based on a comparison between current weighted performance and environmental measurements and the baseline correlations. In certain embodiments, the modules include one or more of hardware circuits, a programmable hardware device and executable code, the executable code stored on one or more computer readable storage media.

In some embodiments, the apparatus further includes a tradeoff learning module that determines updated weighting factors based on observed changes to the performance metrics responsive to a taking of one or more recommended actions of the ranked set and communicates the updated weighting factors to the factor weighting module as part of a machine learning process cycle.

In certain embodiments, the tradeoff learning module further determines whether the taking of one or more recommended actions results in achievement of a predetermined reliability threshold. In various embodiments, the tradeoff learning module further communicates an instruction to the input analysis module to reset the baseline correlations responsive to the taking of the recommended actions that involve device replacement. In some embodiments, the recommended actions are selected from a group consisting of prompt device replacement, delayed device replacement, workload shifting within the 3D coordinate system, diagnostic testing, design optimization, environmental control adjustments, and so forth.

According to one embodiment, the three-dimensional coordinate system includes X and Y coordinates related respectively to a column and a row within the data center, and a Z coordinate related a height from a floor of the data center. In certain embodiments, the mapping module determines the device coordinate of each replaceable device of the plurality of replaceable devices using a machine readable workbook. In some embodiments, the replaceable devices comprise storage devices. In various embodiments, the performance metrics comprise a plurality of Self-Monitoring, Analysis and Reporting Technology ("SMART") measurements and a plurality of non-SMART performance metrics.

In some embodiments, the environmental measurements measure parameters selected from a group consisting of mechanical vibration, acoustic noise, RF noise, temperature, humidity, etc. In various embodiments, the apparatus further includes an administration module that displays a visual map showing the device coordinate, within the 3D coordinate system, of each replaceable device of the plurality of replaceable devices for which the recommended actions are recommended. The administration module, in some embodiments, further provides instructions to an administrator for taking the recommended actions.

According to one embodiment of the present invention computer-implemented method for cognitive data center management includes determining performance metrics over a predetermined time interval at a device coordinate in a three-dimensional ("3D") coordinate system for each replaceable device of a plurality of replaceable devices within a data center. In some embodiments, the method includes mapping the performance metrics to environmental measurements taken in the predetermined time interval at sensor coordinates in the 3D coordinate system.

In various embodiments, the method includes using discovery analytics to determine a predicted time to failure for each replaceable device of the plurality of replaceable devices based on baseline correlations of the performance metrics and the device coordinate for each of the plurality of replaceable devices, and the environmental measurements captured at the sensor coordinates. In certain embodiments, the method includes assigning a weighting factor to each environmental measurement ("weighted environmental measurement") and each performance metric ("weighted performance metric"). In one embodiment, the method includes communicating to an administrator, a ranked set of recommended actions for mitigating a predicted failure of one or more of the replaceable devices, the failure predicted based on a comparison of current weighted performance metrics and environmental measurements with the baseline correlations.

In certain embodiments, the method includes communicating updated weighting factors for assigning to each environmental measurement and each performance metrics based on observed changes to the performance metrics responsive to a taking of one or more recommended actions of the ranked set as part of a machine learning process cycle. In some embodiments, the method includes communicating a command to reset the baseline correlations responsive to the taking of the recommended actions that involve device replacement. The method in some embodiments further includes determining whether the taking of one or more recommended actions results in achievement of a predetermined reliability threshold.

In certain embodiments, the recommended actions are selected from a group consisting of prompt device replacement, delayed device replacement, workload shifting within the 3D coordinate system, diagnostic testing, design optimization, environmental control adjustments, and so forth. In some embodiments, the 3D coordinate system includes X and Y coordinates related respectively to a column and a row within the data center, and a Z coordinate related to a height from a floor of the data center. In various embodiments, the method further includes determining the device coordinate of each replaceable device of the plurality of replaceable devices using a machine readable workbook.

According to one embodiment of the invention, a computer program product for cognitive data center management includes a computer readable storage medium having program instructions embodied therewith. In the embodiment, the program instructions are executable by a processor to cause the processor to determine performance metrics over a predetermined time interval at a device coordinate in a three-dimensional ("3D") coordinate system for each replaceable device of a plurality of replaceable devices within a data center. In at least one embodiment, the program instructions cause the processor to map the performance metrics to environmental measurements taken in the predetermined time interval at sensor coordinates in the 3D coordinate system.

In some embodiments, the program instructions cause the processor to use discovery analytics to determine a predicted time to failure for each replaceable device of the plurality of replaceable devices based on baseline correlations of the performance metrics and the device coordinate for each of the plurality of replaceable devices, and the environmental measurements captured at the sensor coordinates. In various embodiments, the program instructions cause the processor to assign a weighting factor to each environmental measurement ("weighted environmental measurement") and each performance metric ("weighted performance metric") and to communicate to an administrator, a ranked set of recommended actions for mitigating a predicted failure of one or more of the replaceable devices, the failure predicted based on a comparison between current weighted performance and environmental measurements and the baseline correlations. In various embodiments, the program instructions further cause the processor to provide feedback as part of a machine learning process cycle for updating the weighting factor based on the performance metrics observed in response to taking one or more of the recommended actions.

FIG. 1 is a schematic block diagram illustrating one embodiment of a system 100 for cognitive data center management in accordance with one embodiment of the present invention. The system 100 includes a management apparatus 102 in computer storage 104 in a computer 106 with a CPU 108 and memory 110, and computer network 112.

In one embodiment, the management apparatus 102 is configured to determine performance metrics of data center computing resources such as for example, servers, computers, networking equipment such as routers or switches, security infrastructure such as firewall or security systems, storage such as storage area networks ("SAN"), storage enclosures, backup storage, racks 114, nodes 116, and replaceable devices 118a-118n (collectively or individually "118"), which are described below. In certain embodiments, the management apparatus 102 determines performance metrics over a predetermined time interval at a device coordinate in a three-dimensional ("3D") coordinate system for each replaceable device of a plurality of replaceable devices 118 within a data center.

In various embodiments, the data center further includes non-computing resources including power units 122 such as backup generators, uninterruptible power supplies, lighting, switching units and the light. In some embodiments, the data center also includes cooling units 126 such as air conditioning units, liquid cooling units, refrigerant pumps, and the like. In certain embodiments, the non-computing resources such as power units 122 and cooling units 126 also refer to different types of resources at different levels. For example, with regard to a data center computer room, the term "cooling unit" refer to one or more of several computer room air conditioning units.

On the other hand, at a different level of hierarchy such as for example within a particular node or drawer, individual device fans, server fans, rack fans or blowers, can be considered a type of cooling unit and environmental measurements may be made with regard to such non-computing resources. For example, a particular sensor 120 may sense a fan speed of a particular fan within a specific node 116 in a certain rack 114. As used herein, the term "node" e.g., node 116 refers to a device that can contain replaceable components such as for example, a computer node, an external drive enclosure, a network switch, etc.

In some embodiments, the system 100 includes a plurality of sensors 120 that are disposed and configured to make environmental measurement at various coordinates in the 3D coordinate system. For example, in certain embodiments, the sensors 120 are disposed at sensor coordinates, on, within, or adjacent to racks 114, nodes 116, the management apparatus 102 is configured to map the performance metrics to environmental measurements taken in the predetermined time interval at sensor coordinates in the 3D coordinate system.

In some embodiments, the environmental measurements are taken using various sensors 120 disposed at sensor coordinates, on, within, or adjacent to non-computing resources. In certain embodiments, the device coordinates and sensor coordinates overlap, such as for example, when the sensors 120 are embedded within the replaceable devices 118.

In one embodiment, the management apparatus 102 uses discovery analytics to determine a predicted time to failure for each replaceable device e.g., 118a, 118b, 118c, and so forth to 118n of the plurality of replaceable devices 118 based on baseline correlations of the performance metrics and the device coordinate for each of the plurality of replaceable devices 118, and the environmental measurements captured at the sensor coordinates.

In certain embodiments, the management apparatus 102 assigns a weighting factor to each environmental measurement ("weighted environmental measurement") and each performance metric ("weighted performance metric"). In various embodiments, the management apparatus 102 determines, and communicates to an administrator 124, a ranked set of recommended actions for mitigating a predicted failure of one or more of the replaceable devices 118, the failure predicted based on a comparison between current weighted performance and environmental measurements and the baseline correlations. In some embodiments, the administrator 124 is included in computer 106. In other embodiments, the administrator 124 in included in another computer similar to computer 106. The management apparatus 102 is described further in relation to the apparatuses 200, 300 of FIGS. 2 and 3.

While the management apparatus 102 is depicted in computer storage 104, such as a hard disk drive, flash memory or other non-volatile storage, all or a portion of the management apparatus 102 may be located elsewhere, such as in a storage area network, cloud storage, network attached storage or other computer data storage external to the computer 106. In addition, all or a portion of the management apparatus 102 may be located in memory 110, such as cache, random access memory ("RAM") or other non-volatile memory 110 accessible by the central processing unit ("CPU") 108. The computer storage 104 may take the form of a hard disk drive, solid state storage, optical storage and the like or may be external to the computer 106.

The computer 106 may be a server, a workstation, a desktop computer, a laptop computer, a mainframe computer or other computing device capable of running the management apparatus 102. In some embodiments, the computer 106 is a dedicated computing device configured to operate, execute, etc. the management apparatus 102. In some embodiments, the computer 106 includes one or more CPUs 108 or a CPU with two or more cores. In some embodiments, the management apparatus 102 may run on a virtual machine in a partition configured using one or more CPUs or cores of a server. One of skill in the art will recognize other computers 106 capable of running the management apparatus 102.

In some embodiments, the computer 106 is a server connected to one or more replaceable devices 118 and/or one or more sensors 120 through a computer network 112. The computer network 112 may include a LAN, a WAN, a fiber network, the Internet, a wireless network, or a combination of networks. One of skill in the art will recognize other computers 106 and computing environments appropriate for execution of the management apparatus 102. In some embodiments, the computer 106 is located in the data center. In other embodiments, the computer 106 is located external to the data center.

In addition, all or a portion of the management apparatus 102 may be implemented using hardware circuits and/or a programmable hardware device. For example, all or a portion of the management apparatus 102 may be implemented using an FPGA. In another example, all or a portion of the management apparatus 102 may be implemented using one or more hardware circuits. One of skill in the art will recognize other ways that the management apparatus 102 may be implemented.

Figure 2:
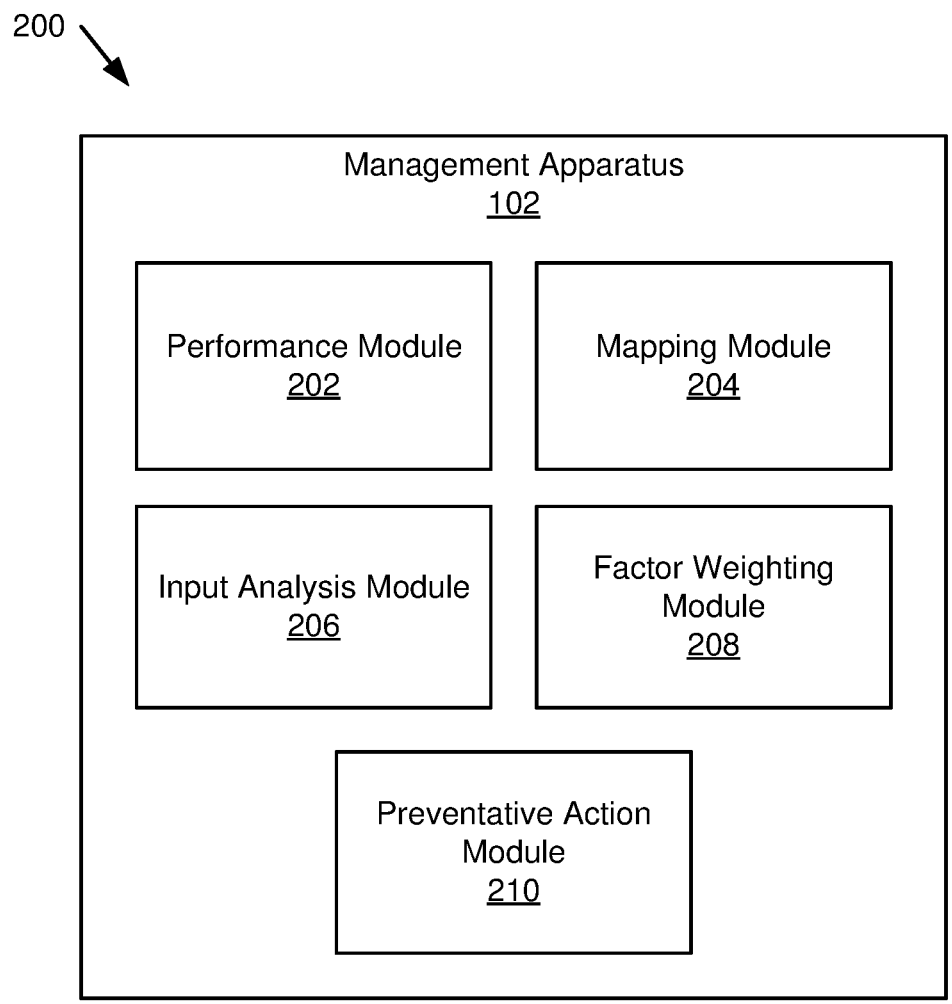
FIG. 2 is a schematic block diagram illustrating one embodiment of an apparatus for cognitive data center management.

FIG. 2 is a schematic block diagram illustrating one embodiment of an apparatus 200 for cognitive data center management. The apparatus 200 includes one embodiment of the management apparatus 102 that includes a performance module 202, a mapping module 204, an input analysis module 206, a factor weighting module 208, and a preventative action module 210, which are described in more detail below.

Data centers involve data storage and thus many of the examples provided herein relate to replaceable devices 118, such as for example, data storage enclosures, hard disk drives, solid state drives, storage area networks, and so forth. However, the embodiments described herein in many examples further apply to other categories of the replaceable devices 118 such as graphics processing units ("GPUs"), network interfaces, processing units, and so forth, unless otherwise clear from context.

The apparatus 200 includes a performance module 202 that determines performance metrics over a predetermined time interval at a device coordinate in a three-dimensional ("3D") coordinate system for each replaceable device of a plurality of replaceable devices 118 within a data center.

In some embodiments, the performance module 202 determines performance metrics that include direct performance metrics and indirect performance metrics. As used herein, the term "direct performance metric" refers to a performance and/or status metric for which the value can be measured or read directly.

In various embodiments, the performance module 202 determines performance metrics for replaceable devices 118 that are storage devices such as hard disk drives, solid-state drives, storage enclosures, optical drives, and so forth.

Some existing HDDs have embedded Self-Monitoring, Analysis and Reporting Technology ("SMART") that detects and reports certain statuses of the HDD. However, one problem with existing systems that use SMART attributes to detect or report failures or impending failures is that such systems often make such determinations exclusively by analyzing only a subset of SMART attributes, without looking at the impact that environmental variables have on HDD performance over time and without looking at non-SMART performance metrics or environmental measurements not included in SMART attributes.

Accordingly, in certain embodiments, the performance module 202 significantly improves upon predictive failure technology by determining performance metrics that include a plurality of Self-Monitoring, Analysis and Reporting Technology ("SMART") measurements, a plurality of non-SMART performance metrics, and a plurality of environmental variables not included in SMART attributes. Additionally, in various embodiments, the performance module 202 captures a significant number of SMART measurements rather than merely subset so that even minute changes in such measurements over space and time can be detected and utilized in predictive and preventative data center management.

For example, with reference to hard disk drive failure and reliability, a few direct metrics include errors such as operating system soft errors, correctable errors on processors, fan failures, Self-Monitoring, Analysis and Reporting Technology ("SMART") attributes, enclosure temperatures, device temperatures, ambient temperatures, enclosure novation, device vibration, spindle runout, flying height, and the like.

As used herein, the term "indirect performance metric" refers to a performance or status metric for which the value can be calculated, inferred, or otherwise derived from other metrics. A few examples of indirect performance metrics include read/write latency, bandwidth, fan ramp, performance degradation, positional error signal, soft error rate, and so forth.

In various embodiments, the performance module 202 determines the performance metrics for each replaceable device e.g., 118a, 118b, 118c and so on to 118n over a predetermined period of time. In certain embodiments, the performance module 202 determines an average value of the performance metrics by aggregating individual measured values during the predetermined period of time and dividing the sum of the measured values by the number of measurements. In certain embodiments, the performance module 202 determines the performance metrics using an automated routine to measure bandwidth, latency, and other calculated values, on an interval set by the management apparatus 102. The interval value, in some embodiments, is determined by the administrator 124.

In some embodiment, the performance module 202 determines trends and performance metrics over a predetermined interval of time by first determining a baseline set of performance metrics for a first predetermined interval. The performance module 202 then determines performance metrics for a second predetermined interval and compares the values for the second predetermined interval with the baseline values for the first predetermined interval. More details regarding determining a baseline set of performance metrics are provided below with respect to FIG. 3.

In various embodiments, the timing of each performance metric does not necessarily correspond to a specific number of measurements and a particular timing of the measurements with respect to particular environmental measurements. In other words, determining the performance metrics and the environmental measurements asynchronously within a predetermined interval of time is sufficient to detect trends and other temporal correlations between performance metrics and the environmental measurements.

In certain embodiments, the performance module 202 determines a device coordinate within a three-dimensional coordinate system for each of the replaceable devices e.g. 118a, 118b, 118c . . . 118n of the plurality of replaceable devices 118. In some embodiments, the three-dimensional coordinate system includes X and Y coordinates, which in some embodiments is related respectively to a column and a row within the data center, and a Z coordinate related a height from a floor of the data center. One example of an embodiment that includes X and Y coordinates related respectively to columns and rows within the data center and a Z coordinate related to a height from the floor the data center is depicted and described in more detail with regard to FIG. 5 below.

In various embodiments, the 3D coordinate system refers to a Cartesian coordinate system having the same scale for distances in the X, Y, and Z axes. In other embodiments, the scale of one of more distances is relative and may differ for one or more of the X, Y, and Z axes. In some embodiments, the 3D coordinate system is hierarchical. For example, within the data center environment, the 3D coordinate system refers to rows and columns of server racks 114 and a height from a floor of the data center of particular nodes or drawers within the rack 114. In one embodiment, these references represent a highest level of hierarchy in a spatial map. In such embodiments, a lower level of hierarchy of the 3D coordinate system refers to spatial relationship between replaceable devices 118 with in each node 116.

In certain embodiments, the performance module 202 determines the device coordinate by reading a machine-readable workbook ("MRW"). The MRW specifies the spatial relationship between two replaceable devices 118, such as for example, a replaceable device 118a disposed in slot 3 and replaceable device 118b disposed in slot 4 which is adjacent to the right-hand side of slot 3. In some embodiments, the machine-readable workbook specifies rules related to certain control specifications for one or more replaceable devices 118. For example, if a temperature measurement of a processor 'A' goes above a specified temperature 'X' degrees C. (specified in the MRW), an on-chip controller ("OCC") clips the maximum frequency. In another example, if a temperature of the memory goes above degrees X' degrees C. (specified in the MRW), the OCC throttles the memory.

The management apparatus 102, in some embodiments, includes a mapping module 204 that maps the performance metrics to the environmental measurements taken in the predetermined time interval at sensor coordinates in the 3D coordinate system. The terms "maps" or "mapping" and similar terms as used herein refers generally to determining a spatial relationship between two or more metrics. Mapping the performance metrics to the environmental measurements includes mapping the performance metrics to the surrounding sensors 120 and potential sources of interference that affect replaceable device performance which are sensed directly by the sensors 120 at the sensor coordinates and/or interpolated or extrapolated where distance exists between device coordinates and sensor coordinates. For example, in certain embodiments, the mapping module 204 determines a spatial relationship between a first performance metric of a replaceable device 118a, a second performance metric of replaceable device 118b, and one or more environmental metrics taken in the predetermined time interval at a first sensor coordinate in the 3D coordinate system.

In one embodiment, the first replaceable device 118a is disposed within a physically lower storage enclosure 116a in a rack 114 and the second replaceable device 118b is disposed within a physically higher storage enclosure 116b that sits above the first storage enclosure 116a in the rack 114 the coordinate value of the second replaceable device 118b would be greater than the "Z" or height-related coordinate value of the first replaceable device 118a.

In certain embodiments, the mapping module 204 determines a spatial relationship between particular device coordinates and particular sensor coordinates in which at least some of the sensor coordinates are distinct in number and position from at least some of the device coordinates. In other words, a one-to-one correspondence between device coordinates and sensor coordinates does not need to exist and in many embodiments does not exist. On the other hand, many replaceable devices 118 include embedded sensors in which the device coordinate corresponds to the sensor coordinate.

In some embodiments, mapping the performance metrics to the environmental measurements includes mapping a first set of performance metrics of a first replaceable device 118a at a first device coordinate to a second set of performance metrics of the second replaceable device 118b at a second device coordinate. In other words, mapping performance metrics of the various replaceable devices 118 having different device coordinates improves the ability of the management apparatus 102 to use discovery analytics with machine learning to calculate correlations and to determine a predicted time to failure for the replaceable devices 118a and 118b. Continuing the example, the mapping module 204 may record a current temperature measurement or metric of 40° C. taken by a temperature sensor at a sensor coordinate corresponding to the device coordinate of the first replaceable device 118a e.g., a hard disk drive ("HDD") in the lower storage enclosure e.g., node 116a and may further record a current temperature measurement or metric of 51° C. taken by a sensor having a sensor coordinate corresponding to the device coordinate of the second replaceable device 118b e.g., another hard disk drive ("HDD") in the upper storage enclosure e.g., node 116b within the rack 114. Accordingly, the mapping module 204 maps the respective performance metrics taken respectively at the device coordinates within the 3D coordinate system of the first and second replaceable devices 118a and 118b to the environmental measurements taken at respective sensor coordinates in the 3D coordinate system based on the respective spatial relationships between the replaceable devices 118 and the sensors 120 used to take the temperature measurements.

In some embodiments, the mapping module 204 takes environmental measurements that measure parameters such as mechanical vibration, acoustic noise, RF noise, temperature, humidity, magnetic interference, optical interference, solar interference from one or more of alpha particles, high-energy ions, and solar flares, or any event or phenomena that can potentially influence device performance. For example, the mapping module 204 may take environmental measurements relative to a particular server, storage enclosure, or hard disk drive using vibration sensors 120, noise sensors 120, etc. disposed on other servers or storage enclosures within the same rack e.g., 114a, sensors 120 disposed on other servers or storage enclosures within a different rack e.g. 114b in a different column within the same data center row of racks, or sensors 120 (e.g., vibration, noise, etc.) disposed on other servers or storage enclosures within a different rack within a different data center column on a different data center row at a different height within the rack.

In each of the aforementioned examples, the mapping module 204 maps the performance metrics of the respectively positioned replaceable devices 118 to the environmental measurements of the respectively positioned environmental sensors 120 e.g., vibration or noise sensors. For example, in some embodiments, a first sensor 120 such as a vibration sensor is disposed in, on, or near, a first replaceable device e.g., 118a disposed at a first device coordinate. The mapping module 204 maps the first sensor measurement relative to the performance metrics of the first device e.g. 118a where the sensor coordinate of the first sensor is substantially similar to the device coordinate of the first replaceable device 118a.

In such embodiments, the mapping module 204 also maps the first sensor measurement relative to the performance metrics of the second device e.g. 118b which has a device coordinate that is some distance away from the device coordinate of the first replaceable device 118a. This mapping allows baseline correlations of performance metrics and environmental measurements to be compared with current performance metrics and environmental measurements taking into account the distance between the device coordinate of the first replaceable device and the device coordinate of the second replaceable device e.g. 118b.

In some embodiments, the mapping module 204 uses the distance, relative displacement, etc. from a sensor 120 of current performance measurement and knowledge of structural elements of the racks 114, flooring, etc. to translate the current performance measurement into a value that is likely at a replaceable device 118. For example, if a sensor 120 measures temperature and is located at a particular height on a rack (e.g. 114a) and a first replaceable device 118a is located lower on the rack 114a than the sensor 120, the mapping module 204, in some embodiments, can estimate a lower temperature at the first replaceable device 118a than at the sensor 120 due to general knowledge of heat rising. The mapping module 204 may use a location of cooling units 122, locations of other heat producing units (e.g. power unit 126, replaceable devices 118), etc. to aid in estimating a temperature at the first replaceable device 118a based on 3D coordinates of the various devices 118, 133, 126, etc. and sensors 120.

Similarly, the mapping module 204 may interpolate other measurements from sensors 120, such as vibration. For example, a sensor 120 may measure a certain amount of vibration at a particular point on a rack 114 and the mapping module 204 may estimate a different amount of vibration at a first replaceable device 118a based on spatial differences between the vibration sensor 120 and the first replaceable device 118a. Some sensors 120 may make measurements that are applicable to the data center while the mapping module 204 may interpolate measurements based on 3D displacements between sensors 120 and replaceable components 118. In addition, discovery analytics with machine learning, in some embodiments, is used to refine interpolations of sensor readings over time, which is described in further detail below.

In one embodiment, the management apparatus 102 includes an input analysis module 206 that uses discovery analytics with machine learning to determine a predicted time to failure for each replaceable device of the plurality of replaceable devices 118 based on baseline correlations of the performance metrics and the device coordinate for each of the plurality of replaceable devices 118, and the environmental measurements captured at the sensor coordinates. In certain embodiments, the input analysis module 206 filters outlier data from the performance metrics and/or the environmental measurements.

In various embodiments, the input analysis module 206 determines baseline performance metrics for individual replaceable devices 118 as well as aggregate baselines for plurality of replaceable devices 118 the input analysis module 206 also determines baseline environmental measurements both individually and in the aggregate for a plurality of environmental sources of noise, interference, etc. that are potentially capable of affecting the performance metrics as measured by sensors 120 at specific sensor coordinates. These individual and aggregate baselines allow the input analysis module 206 to compare baseline spatial and temporal correlations between performance metrics and environmental measurements with current performance metrics and environmental measurements to detect patterns and trends.

In various embodiments, before and after failure of a replaceable device 118 occurs, the management apparatus 102 uses discovery analytics with machine learning by communicating the performance metrics and the environmental measurements to a discovery analytics engine that detects patterns and actionable insights that highlight relationships and correlations between the performance metrics and the environmental measurements. One example of a discovery analytics engine is the IBM Watson™ Discovery analytics engine.

In various embodiments, a discovery analytics engine may compare differences in performance between two replaceable devices 118 at device coordinates separated by a determinable distance with differences in environmental measurements such as temperature, vibration, electrical noise, and so forth taken by sensors 120 where the differences in the distances between a sensor 120 and each replaceable device 118 is determinable. Then, the machine learning process cycle progresses as the discovery analytics engine receives feedback from the preventative action module 210 regarding failures detected in the replaceable devices 118 and whether recommended actions result in predicted changes to the performance metrics. As the patterns in spatial and temporal correlations between the performance metrics and the environmental measurements are connected by the machine learning with particular types of failures, future failures of that type may be predicted by detecting such patterns and spatial and temporal correlations. More details regarding spatial correlations over time among performance metrics and environmental measurements are provided below with respect to FIGS. 3-5.

In some embodiments, the input analysis module 206 prepares the performance metrics and the environment measurements by determining a baseline performance of the system 100 e.g., the global ecology of the data center by taking a snapshot of the performance metrics at each device coordinate and the environmental measurements at each at each sensor coordinate for time TO. In certain embodiments, the input analysis module 206 collects data each replaceable device 118 that is capable of producing a measurable performance output. In the embodiments, the input analysis module 206 further collects data from all environmental sensors 120.

In various embodiments, the input analysis module 206 calculates a correlation coefficient that corresponds to the environmental influence per performance metrics per device. For example, the input analysis module 206 calculates the correlation coefficient using relational information between physical parameters e.g., the environmental measurements taken at sensor coordinates within the 3D coordinate system by the sensors 120 and the performance metrics determined for each replaceable device e.g., 118a, 118b, . . . 118n, of the plurality of replaceable devices 118.

In other words, the input analysis module 206 determines which sources of influence have the most significant contribution to the measured performance over the predetermined time interval. Some examples sources of influence include sources of vibration such as motors, generators, compressors associated with data center cooling. Other sources of influence include sources of electrical noise such as switching currents, crosstalk, RF interference, and so forth. Still other sources of influence include changes in device characteristics such as changes in device temperature, changes in rotational speed of hard disk drives, changes in loading of devices and so forth, In certain embodiments, the input analysis module 206 also analyzes the correlations between each performance metric and other performance metrics.

In one embodiment, the management apparatus 102 includes a factor weighting module 208 that assigns a weighting factor to each environment measurement ("weighted environmental measurement") and each performance metric ("weighted performance metric"). The weighted performance metrics and the weighted environmental measurements are used in the input analysis module 206 in analyzing the influence of the environmental measurements taken by the sensors 120 at the sensor coordinates on the performance metrics for the replaceable devices 118. In one embodiment, the factor weighting module 208 initially assigns the weighting factor on a basis similar to order of effects from a designed experiment. In some embodiments, the factor weighting module 208 assigns the weighting factor based on a feedback loop that is part of a machine learning process cycle. An example of assigning the weighting factor based on machine learning is described in more detail below with respect to the preventative action module 210.

In some embodiments, the input analysis module 206 further compares the performance metrics for each replaceable device e.g., 118a, 118b, . . . 118n, of the plurality of replaceable devices 118. In some embodiments, if the performance metrics and/or the environmental measurements move over one predetermined interval relative to the baseline correlations which can be detected by machine learning so as to generate a learning response, the factor weighting module 208 assigns the weighting factor based on the learning response. In certain embodiments, the input analysis module 206 compares the performance metrics of each replaceable device 118 to a control chart. In one embodiment, the control chart is determined from a statistically number of metrics and measurements e.g., 30 data points within the predetermined interval. In some embodiments, if a predetermined ratio or percentage of the data points (e.g., 3/5) fall outside of a predetermined range of acceptable values for the control chart, the factor weighting module 208 assigns the weighting factor to each performance metric and each measurement value based on the learning response.

In some embodiments, the factor weighting module 208 applies a predetermined set of sigma run rules to the data points relative to the control chart and assigning the weighting factor based on the learning response.

In some embodiments, the management apparatus 102 includes a preventative action module 210 that communicates a ranked set of recommended actions for mitigating a predicted failure of one or more of the replaceable devices 118. The failure is predicted based at least in part on a comparison between the current weighted performance metrics and environmental measurements and the baseline correlations.

In various embodiments, the input analysis module 206 uses relevant parameters to estimate and reassess and expected lifetime of each replaceable device in the data center. In some embodiments, the estimate and reassessment is based on the ranked recommended actions, the correlation coefficient of the inflows to performance, and the snapshot of current performance for each replaceable device 118. The preventative action module 210 then ranks the replaceable devices 118 in order of highest potential to fail.

In various embodiments, the various modules of the management apparatus 102 e.g. the performance module 202, the mapping module 204, the input analysis module 206, the factor weighting module 208, and the preventative action module 210 includes one or more of: hardware circuits; a programmable hardware device; and executable code, in which the executables code is stored on one or more computer readable storage media.

Figure 3:
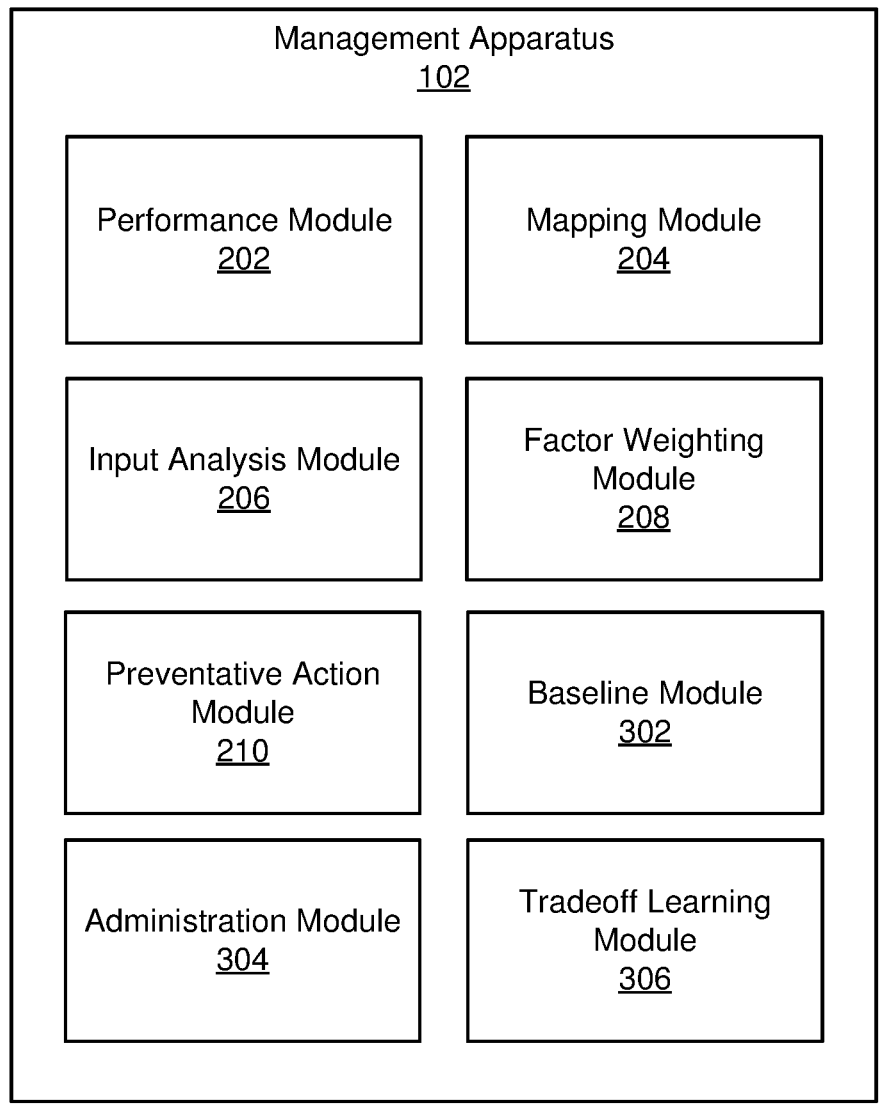
FIG. 3 is a schematic block diagram illustrating another embodiment of an apparatus for cognitive data center management.

FIG. 3 is a schematic block diagram illustrating another embodiment of an apparatus 300 for cognitive data center management. In one embodiment, the apparatus 300 includes one instance of a management apparatus 102. The management apparatus 102 includes a performance module 202, mapping module 204, and an input analysis module 206, a factor weighting module 208, and a preventative action module 210, where each of the modules have a structure and function substantially as described above with respect to FIG. 3. In certain embodiments, the management apparatus 102 further includes a baseline module 302, and administration module 304, and a tradeoff learning module 306, which are described in more detail below.

In one embodiment, the baseline module 302 determines one or more baselines for the performance metrics over predetermined time interval. In certain embodiments, the baseline module 302 captures a set of baseline values for a particular set of devices and environmental conditions where the predetermined time interval is the power up time interval. It may be noted that in some embodiments, the one or more baselines include many performance metrics and environmental measurements stored to one or more records within one or more databases.

In other words, in contrast to existing systems, In some embodiments, the baseline module 302 captures an initial baseline i.e. a set of baseline values at time T0 by running an epilog script that captures various performance metrics and environmental measurements at boot up or start time, such as for example, HDD status variables including SMART attributes, drive error status, and so forth.

In various embodiments, output from the input analysis module 206 is analyzed against predetermined performance goals for each component of the data center ecosystem and against specifications of each contributing source e.g., vibration source, heat source, or other source of environmental influence. In certain embodiments, management apparatus 102 of the apparatus 300 further includes administration module 304 that reports data center status and health in various formats and media (e.g., on-screen, generated chart, automated notification when processing is complete). In some embodiments, the administration module 304 further causes one or more validation tests to be performed to confirm the performance analysis of specific replacement devices e.g. 118a, 118b, . . . 118n.

In some embodiments, the administration module 304 displays a visual map showing the device coordinate, within the 3D coordinate system, of each replaceable device of the plurality of replaceable devices 118 for which the recommended actions are recommended. For example, in response to a recommended action to replace one of the replaceable devices 118, the visual map displays a symbol with an easily visible color such as red, that illustrates the location or coordinates of replaceable device 118 which is to be replaced. The visual map may provide other visual guidance indications or highlighting that illustrates a particular row, rack, node or storage enclosure, slot, and so forth, in which the replaceable device for which a recommended action is to be taken is disposed. For example, in certain embodiments, the administration module 304 displays a visual map with an augmented reality overlay of markers identifying the location of repair needed on a live video feed.

In various embodiments, the administration module 304 further provides instructions to an administrator for taking the recommended actions. For example, in some embodiments, the administration module 304 communicates instructions to an augmented reality device that allows an administrator to visualize both the location of the replaceable device 118 for which a recommended action is to be performed and further visualize the instructions for performing the recommended action.

In certain embodiments, the preventative action module 210 calculates mitigation factors based on output of the discovery analytics portion of the input analysis module 206 according to, for example, strength of weighting factors, loss in performance, and correlation to external influences. In various embodiments, the preventative action module 210 establishes a threshold of performance per replaceable device 118, such as a control chart, that monitors the replaceable device 118n for Out-Of-Control ("OOC") conditions that trigger a recommended action that can include recommended action to investigate further or any recommended action for mitigation (e.g., of the OOC conditions) as described below with respect to FIG. 4

In some embodiments, the set of recommended actions determined by the preventative action module 210 includes actions related to modifications in hardware, software, physical, or design. For example, in certain embodiments, the recommended actions can include prompt device replacement, delayed device replacement, workload shifting within the three-dimensional coordinate system, offloading workload, distributing workload to different data centers, distributing workload across data centers, diagnostic testing, design optimization, environmental control adjustments, etc.

In some embodiments, in response to a determination by the input analysis module 206 that there is a correlation between performance metrics of replaceable device 118n at a first specific device coordinate and a particular workload being run on the replaceable devices 118 such that changes in the performance metrics correlate with the running of the workload, the preventative action module 210 determines a recommended action to move the workload to a different location i.e. a device coordinate away from the first specific device coordinate and to observe a response of the system e.g., changes in performance metrics for the replaceable device 118n.

In one embodiment, the management apparatus 102 of the apparatus 300 further includes a tradeoff learning module 306 that determines updated weighting factors based on observed changes to the performance metrics responsive to a taking of one or more recommended actions of the ranked set and communicates the updated weighting factors to the factor weighting module 208 as part of a machine learning process cycle. One embodiment of a machine learning process cycle is described in more detail below with respect to FIG. 4. In some embodiments, the tradeoff learning module 306 determines whether one or more of the recommended actions was performed on the system. The tradeoff learning module 306 then assesses the responses of various portions of the system 100 to the performed recommended actions.

It may be noted that one or more of the modules of the management apparatus 102, including the tradeoff learning module 306, the baseline module 302, input analysis module 206, or another module, may use machine learning, deep learning, or any other available inferencing engine available to perform tradeoff analytics. The preferred physical location of the modules performing the machine learning, deep learning, or inferencing depends on the security needs of the data center. For a nonsecure data center the modules performing the machine learning may be located in a cloud-based system. On the other hand, for high-security data centers, the modules performing the machine learning may be located within a local private network of servers.

In one example, the input analysis module 206 analyzes the performance metrics and the environmental measurements to determine the source of fatal GPU link errors in a high-performance server in a data center. When the GPU driver reports a particular fatal GPU link error, there are three potential sources of the failure. The tradeoff learning module 306 observes the results of three recommended actions involving replacements of replaceable devices 118 including a CPU, a GPU, and a system planar device. The tradeoff learning module 306 determines that replacing the CPU has an 80% success rate, replacing the GPU has a 10% success rate, and replacing the system planar has a 10% success rate, which results in different weighting factors than initial weighting factors. These updated weighting factors would be fed back to the factor weighting module 208 which in turn feeds the input analysis module 206. As new data is added through additional machine learning process cycles, the tradeoff learning module 306 dynamically adjusts the weighting factors as the tally of successful repairs increases.

For example, in one embodiment, the tradeoff learning module 306 determines whether the taking of one or more of the recommended actions resulted in achievement of a predetermined reliability threshold. In another example, the tradeoff learning module 306 communicates an instruction to the input analysis module 206 to reset the baseline correlations responsive to the taking of the recommended actions that involve device replacement.

Figure 4:
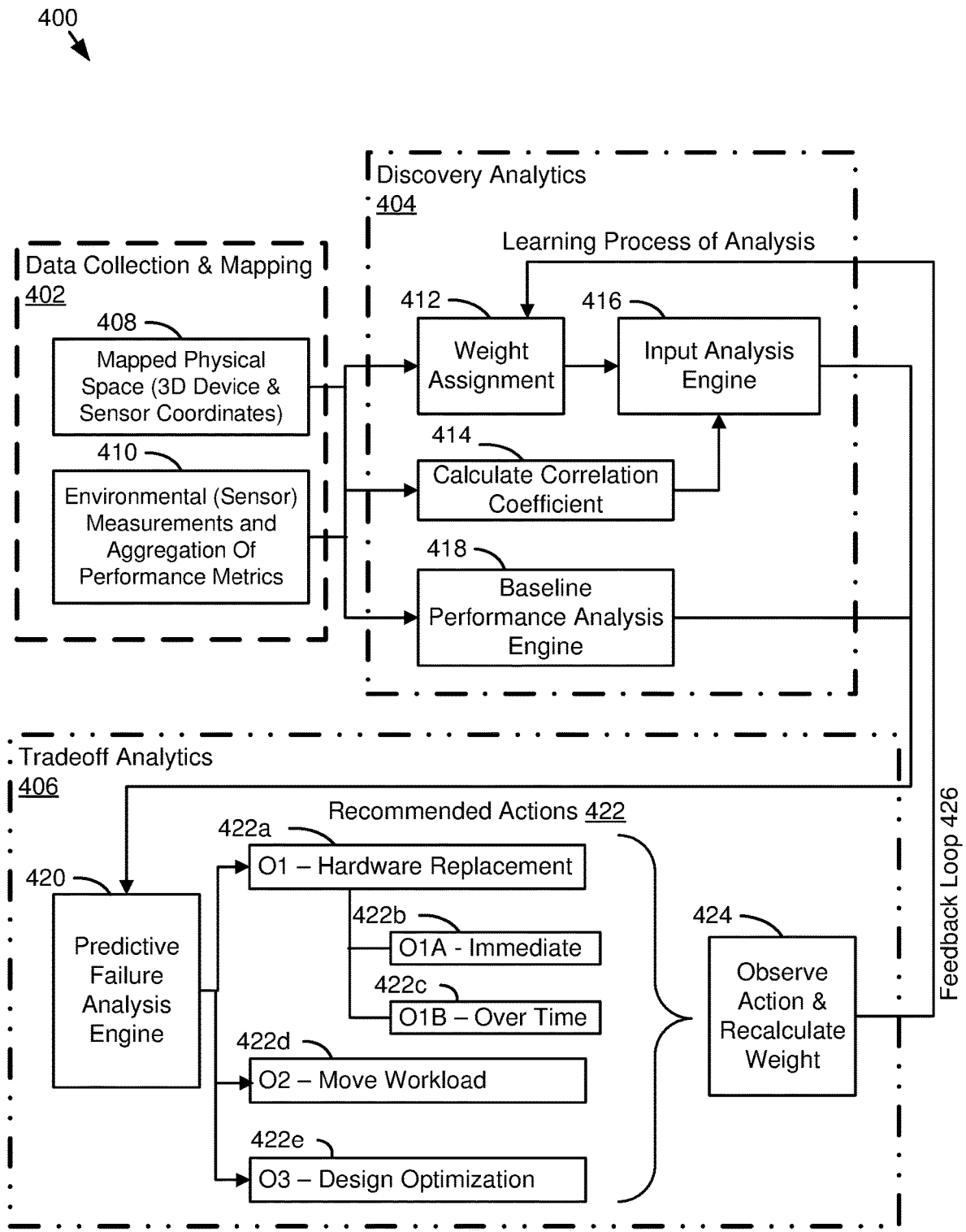
FIG. 4 is a schematic flow chart diagram illustrating one embodiment of a machine learning process cycle for cognitive data center management.

FIG. 4 is a schematic flow chart diagram illustrating an overview of a machine learning process cycle 400 for one embodiment of a system for cognitive data center management. In one embodiment, performance and environmental sensor data 410 in the machine learning process cycle 400 are repeatedly collected and mapped to 3D coordinates 408 of a data center in a data collection and mapping section 402. The mapped data feeds into a discovery analytics section 404 that analyzes it to determine baseline 418 and current spatial and temporal correlations 414 among weighted 412 performance metrics and environmental measurements. The discovery analytics section 404 also determines predicted time to failure of replaceable devices 118 in the data center. The time to failure data and the baseline analysis results flow into a tradeoff analytics section 406.

The tradeoff analytics section 406 analyzes the predicted failure data 420 and the baseline performance data to determine recommended actions 422 for preventing predicted failures. In various embodiments, the recommended actions 422 include a recommended replacement action 422a to replace hardware such as one of the replaceable devices 118. The recommended replacement action 422a may be for immediate replacement 422b or replacement at a predetermined time 422c. Other examples of recommended actions include moving a workload 422d. For example, if the input analysis engine 416 determines a predicted time to failure for a disk drive that correlates with mechanical or electrical stress related to an operational workload near particular device coordinates, the recommended action of moving the workload 422d could more evenly distribute the workload so as to reduce the stress or could move the workload to a device with a different device coordinate that spatially correlates less with environmental measurements related to the failure. The recommended actions 422 are not limited to the example recommended actions 422a-422e and can include any recommended action that potentially improves performance or increases reliability.

The tradeoff analytics section 406 also observes or determines 424 whether taking one or more of the recommended actions 422 results in improved performance and feeds back 426 recalculated weighting factors to the discovery analytics section 404 which applies the recalculated weighting factors as it continues to determine baseline data and temporal and spatial correlations among the performance metrics and the environmental variables.

As the machine learning process cycle 400 is repeatedly performed, when taking a recommended action 422 improves performance, reduces the effect of negative environmental influencing factors, or results in longer times to failure, the machine learning process learns which recommended actions 422 are correlated with the improved performance, reduced negative environmental influencing factors, or longer times to failure and increases the weighting of the relevant factors for future process cycles. Similarly, when performing a recommended action 422 fails to result in improved performance, reduced negative environmental influencing factors, or longer times to failure, the machine learning process cycle 400 learns and decreases the weighting of the corresponding factors.

For example, if performance metrics and environmental data collected in the data collection and mapping section 402 is analyzed by the discovery analytics section 404 which determines that vibration correlates strongly with poor performance metrics of a disk drive near a cooling unit whenever the cooling unit switches on, the tradeoff analytics section 406 may recommend optimizing the design 422e of the data center by mechanically damping or isolating the cooling unit to reduce the vibration. If taking recommended action 422 reduces the correlation between the poor performance of the disk drive and the distance from the disk drive to the cooling unit, the feedback loop 426 from the tradeoff analytics section 406 provides updated weighting 412 factors to be assigned and fed into the input analysis engine 416 which determines an updated ranked list of devices predicted to fail.

As the machine learning process cycle 400 repeats, and recommended actions 422 that lead to improved performance or reduced failure are taken, the correlations and current measurements for the next most likely to fail device on the list are fed into the tradeoff analytics section 406 and the performance and reliability of the data center are proactively improved until the performance and reliability goals or objectives set by an administrator of the data center are achieved.

In various embodiments, one or more modules of the apparatus 200 and/or the apparatus 300, perform the functions of the machine learning process cycle 400 e.g., the data collection and mapping section 402, the discovery analytics section 404 and the tradeoff analytics section 406 as described above with respect to FIGS. 2 and 3. Similarly, in certain embodiments, one or more process steps methods described below with respect to FIGS. 6 and 7 perform the functions of the machine learning process cycle 400.

Figure 5:
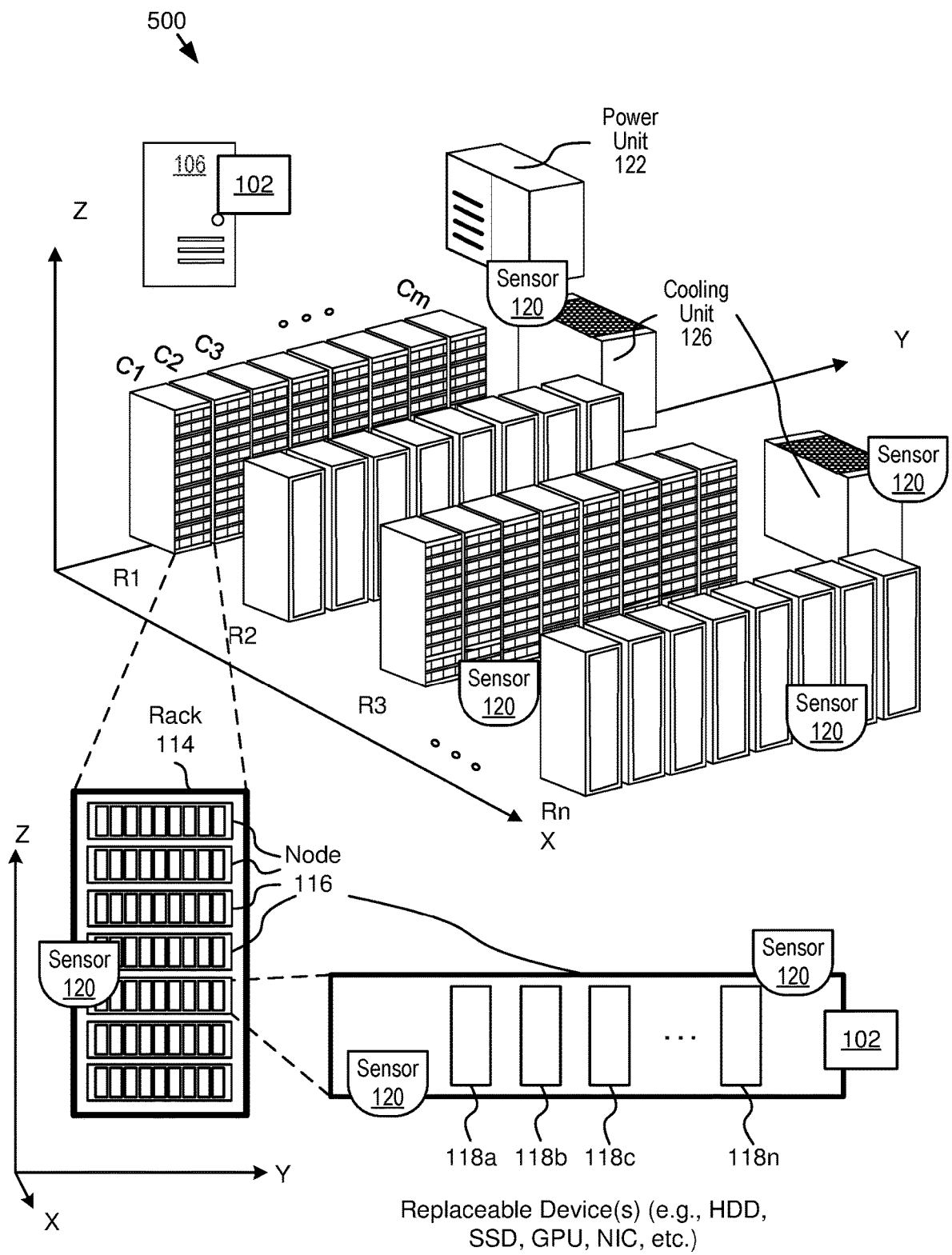
FIG. 5 is a schematic block diagram illustrating an example of a data center that includes an apparatus for cognitive data center management in accordance with one embodiment of the present invention.

FIG. 5 is a schematic block diagram illustrating an example of a data center environment 500 that includes an embodiment of management apparatus 102 for cognitive data center management. Existing data center management methods and apparatuses are prone to various problems. For example, some HDD tools exist that report the status of certain drive conditions. However, such tools do not analyze the impact of such drive conditions on performance over time. Moreover, such tools do not predict HDD failures within reasonable times in advance of a catastrophic failure.

Additionally, existing tools fail to determine spatial correlations over time among environmental measurements capable of influence performance metrics. Thus, the apparatuses, systems, and methods described herein implement the machine learning process cycle 400 which improves data center management technology by determining spatial correlations over time among environmental measurements capable of influencing performance metrics of devices in the data center and uses those spatial correlations over time to improve the performance metrics and reliability of the data center by recommending and taking recommended mitigation actions.

In one embodiment, the data center environment 500 includes multiple rows e.g., R1, R2, R3, . . . Rn, of IT equipment racks as depicted by rack 114. In the embodiment, each row Rn includes multiple columns of IT equipment racks e.g., C1, C2, C3, . . . Cm. Each rack 114 in the embodiment also includes multiple nodes or drawers at different heights from a floor of the data center. In one embodiment, the data center environment 500 is depicted in a 3D coordinate system e.g., row, column, height, or alternatively x, y, z. It may be noted that the 3D coordinate system, in some embodiments, refers to relative spatial relationships, i.e., higher, lower, left, right, rows, columns, without necessarily using a common physical scale.

The 3D coordinate system provides a common reference point for determining distances between replaceable devices 118, sensors 120, and non-computing resources such as power units 122, cooling units 126, and other sources of vibrations, electrical noise, temperature changes, and/or other phenomena capable of influencing performance and/or failure of replaceable devices 118. Thus, the 3D coordinate system assists the management apparatus 102 in determining the relative spatial relationships between performance metrics and thereby determining baseline correlations between environmental measurements and device performance.

In some embodiments, the data center environment 500 includes a computer 106 and a management apparatus 102 that in some embodiments is implemented substantially as described above with respect to FIG. 1. In various embodiments, the management apparatus 102 includes a performance module 202, mapping module 204, an input analysis module 206, a factor weighting module 208 and a preventative action module 210 that have structures and functions that are substantially similar to the modules described above with respect to FIGS. 1, 2, and 3.

In various embodiments, the management apparatus 102 significantly improves data center management technology over existing tools by using discovery analytics to determine correlations including spatial correlations between a significant number of performance metrics of replaceable devices 118 and a significant number of environmental measurements using a common 3D coordinate system. Similarly, the management apparatus, in certain embodiments, further determines temporal relationships or trends over predetermined time intervals rather than merely reporting specific events that occur at specific points in time.

For example, management apparatus 102 in some embodiments may determine baseline correlations between drives having particular spatial relationships. For example, electrical or RF noise measured in mixed-signal circuits of a disk drive may have a positive correlation with proximity to a switching noise source such as the power unit 122 or cooling unit 126 turning on or off. Temperatures measured by sensors 120 at a higher node 116 or drawer within a rack 114 may be higher than temperatures measured by sensors 120 at a lower node 116 or drawer. Accordingly, once baseline correlations between performance metrics and environment measurements have been determined over predetermined interval, changes to the baseline performance metrics and/or the environmental measurements can be determined which are thereby used to predict time to failure for one or more replaceable devices 118 and to determine one or more recommended actions 422 to mitigate the predicted failure.

Figure 6:
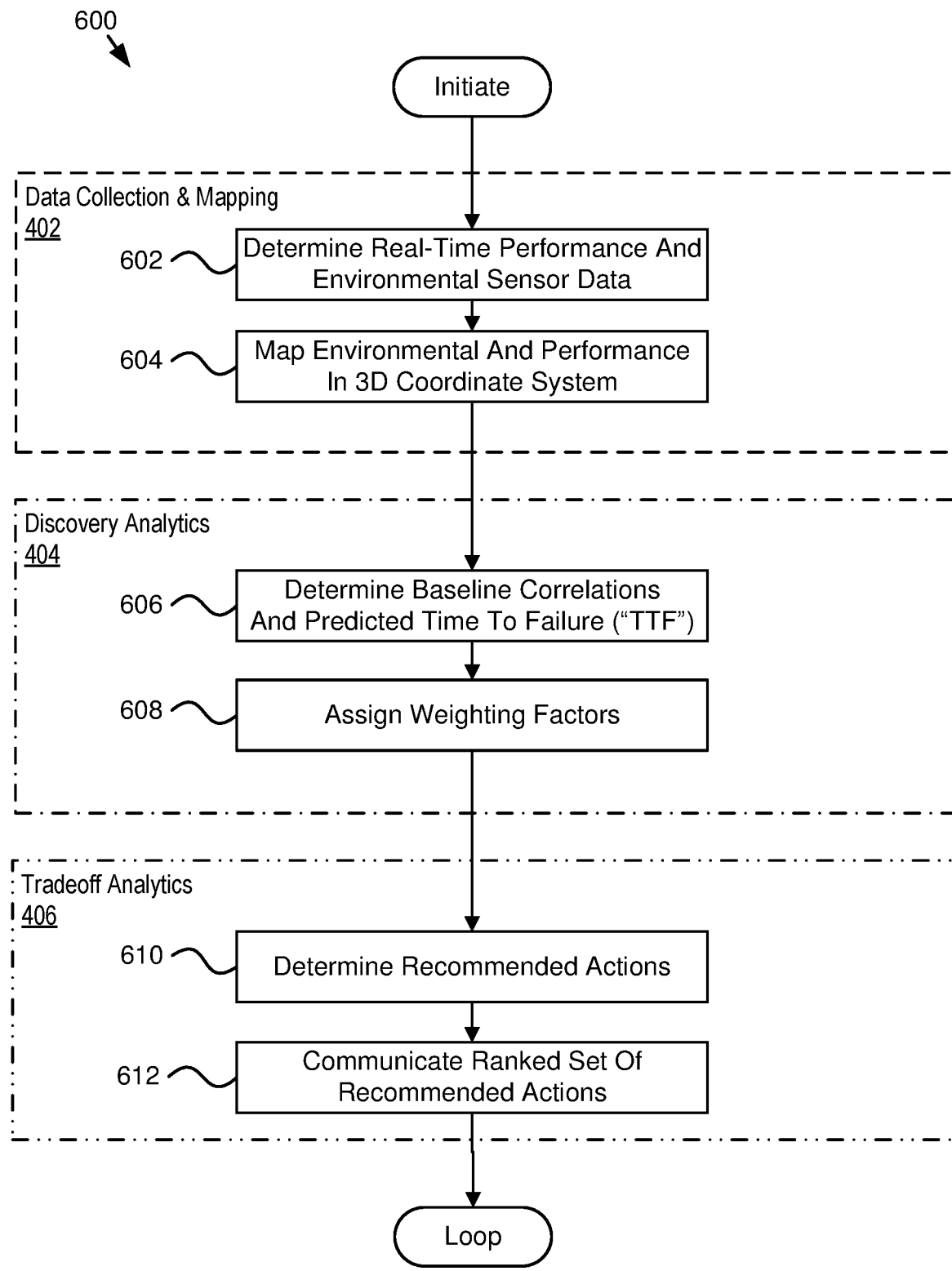
FIG. 6 is a schematic flow chart diagram illustrating one embodiment of a method for cognitive data center management.

FIG. 6 is a schematic flow chart diagram illustrating one embodiment of a method 600 for cognitive data center management. In one embodiment, the method 600 begins and determines 602 performance metrics over a predetermined time interval at a device coordinate in a three-dimensional ("3D") coordinate system for each replaceable device of a plurality of replaceable devices e.g., 118 within a data center. In various embodiments, the predetermined time interval is a rolling interval whereby the method determines 602 performance metrics repeatedly with the beginning time and ending times of the rolling interval continuously rolling forward over time.

The method 600 maps 604 the performance metrics to environmental measurements taken (e.g., by sensors 120) in the predetermined time interval at sensor coordinates in the 3D coordinate system. Determining 602 the performance metrics and mapping 604 the performance metrics to the environmental measurements correspond, in some embodiments, to the data collection and mapping section 402 of the machine learning process cycle 400 described above with respect to FIG. 4.

The method 600 uses discovery analytics to determine 606 a predicted time to failure for each replaceable device of the plurality of replaceable devices based on baseline correlations of the performance metrics and the device coordinate for each of the plurality of replaceable devices, and the environmental measurements captured at the sensor coordinates. The method 600 assigns 608 a weighting factor to each environmental measurement ("weighted environmental measurement") and each performance metric ("weighted performance metric"). In certain embodiments, determining 606 the baseline correlations and predicted time to failure and assigning 608 the weighting factors are performed as a part of the discovery analytics section 404 of the machine learning process cycle 400 described above with respect to FIG. 4.

The method 600 determines 610 and communicates 612 to an administrator, a ranked set of recommended actions for mitigating a predicted failure of one or more of the replaceable devices, the failure predicted based on a comparison correlations with respect to a reliability target influenced by device specifications, a desired performance target, and a desired reliability target In the embodiments, method 600 loops and machine learning process cycle repeats In various embodiments, determining 610 the ranked set of recommended actions and communicating 612 the recommended actions to an administrator are performed as a part of the tradeoff analytics section 406 of the machine learning process cycle 400 described above with respect to FIG. 4. In some embodiments, the performance module 202, the mapping module 204, the input analysis module 206, the factor weighting module 208 and the preventive action module 210 implement one or more steps of the method 600.

Figure 7:
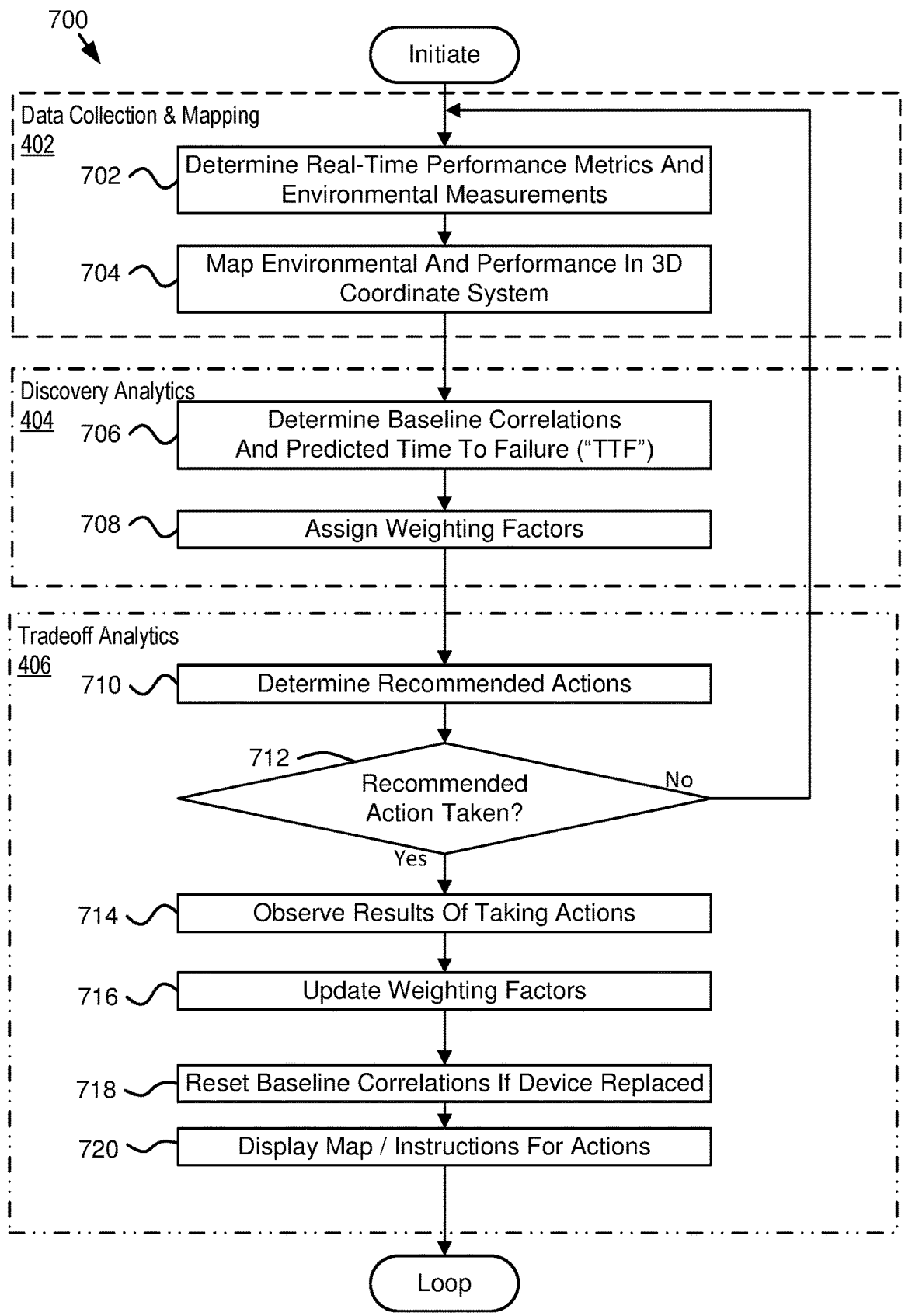
FIG. 7 is a schematic flow chart diagram illustrating another embodiment of a method for cognitive data center management.

FIG. 7 is a schematic flow chart diagram illustrating another embodiment of a method 700 for cognitive data center management. In one embodiment, the method 700 begins and determines 702 performance metrics over predetermined time interval at a device coordinate in a three-dimensional ("3D") coordinate system for each replaceable device of a plurality of replaceable devices e.g., 118 within a data center. In some embodiments, the method 700 and determines the 3D device coordinate using a machine-readable workbook. The method 700 maps 704 the performance metrics to environmental measurements taken in the predetermined time interval at sensor coordinates in the 3D coordinate system.

The method 700 continues and uses 706 discovery analytics with machine learning to determine a predicted time to failure for each replaceable device of the plurality of replaceable devices e.g., 118 based on baseline correlations of the performance metrics and the device coordinate for each of the plurality of replaceable devices e.g. 118, and environmental measurements captured at the sensor coordinates (e.g., by sensors 120). The method 700 assigns 708 a weighting factor to each environmental measurement ("weighted environmental measurement") and each performance metric ("weighted performance metric").

The method 700 continues and communicates 710 to an administrator (e.g., administrator 124), a ranked set of recommended actions for mitigating a predicted failure of one or more of the replaceable devices, the failure predicted based on the comparison of current weighted performance metrics and environmental measurements with the baseline correlations. In some embodiments, the recommended actions are selected from a group consisting of property device playback, delay device replacement workload shifting within the three-dimensional coordinate system, diagnostic testing, design optimization, environment of control adjustments, etc.

In some embodiments, the method 700 further determines 712 whether one or more of the recommended actions has been taken and in response, observes 714 results of taking the one or more recommended actions e.g., whether taking the one or more recommended actions improve performance metrics for the relevant replaceable devices, had no impact on performance metrics, or worsened performance metrics.

In some embodiments, the method 700 updates 716 weighting factors for assigning to each environmental measurement and each performance metrics based on observed changes to the performance metrics. In various embodiments, the method 700 continues and communicates 718 an instruction to reset the baseline correlations responsive to the taking of recommended actions that involve device replacement.

In certain embodiments, the method 700 displays 720 a visual map and/or instructions for taking the recommended actions as described above with respect to the administration module 304 depicted in FIG. 3.

In various embodiments, the 3D coordinate system includes X and Y coordinates relative to a predetermined XY origin within the data center, or as an example, X and Y coordinates related respectively to a column and row within a data center, and a Z coordinate related to a height from the floor of the data center. In certain embodiments, the performance module 202, the mapping module 204, the input analysis module 206, the factor weighting module 208, the preventive action module 210, the administration module 304, and the tradeoff learning module 306 implement one or more steps of the method 700.

In certain embodiments, one or more steps of the method 700 are depicted as corresponding to respective parts of the data collection and mapping section 402, discovery analytics section 404, and tradeoff analytics section 406 of the machine learning process cycle 400 described above with respect to FIG. 4. In some embodiments, one or more steps of the method 600 and/or the method 700 may be implemented by a computer program product for cognitive center data management.

In some embodiments, the computer program product includes a computer readable storage media e.g., computer storage 104, having program instructions embodied therewith. In one embodiment, the program instructions are executable by processor to cause the processor to determine performance metrics over a predetermined time interval at a device coordinate in a three-dimensional ("3D") coordinate system for each replaceable device of a plurality of replaceable devices within a data center. In the embodiment, the program instructions cause the processor to map the performance metrics to environmental measurements taken in the predetermined time interval at sensor coordinates in the 3D coordinate system.

In some embodiments, the program instructions cause the processor to use machine learning to determine a predicted time to failure for each replaceable device of the plurality of replaceable devices based on baseline correlations of the performance metrics and the device coordinate for each of the plurality of replaceable devices, and the environmental measurements captured at the sensor coordinates. In certain embodiments, the program instructions cause the processor to assign a weighting factor to each environmental measurement ("weighted environmental measurement") and each performance metric ("weighted performance metric").

In various embodiments, the program instructions cause the processor to communicate to an administrator, a ranked set of recommended actions for mitigating a predicted failure of one or more of the replaceable devices, the failure predicted based on a comparison between current weighted performance and environmental measurements and the baseline correlations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
   a performance module that determines performance metrics over a predetermined time interval at a device coordinate in a three-dimensional ("3D") coordinate system for each replaceable device of a plurality of replaceable devices within a data center;
   a mapping module that maps the performance metrics to environmental measurements taken in the predetermined time interval at sensor coordinates in the 3D coordinate system;
   an input analysis module that uses discovery analytics with machine learning to determine a predicted time to failure for each replaceable device of the plurality of replaceable devices based on baseline correlations of the performance metrics and the device coordinate for each of the plurality of replaceable devices, and the environmental measurements captured at the sensor coordinates;

a factor weighting module that assigns a weighting factor to each environmental measurement ("weighted environmental measurement") and each performance metric ("weighted performance metric"); and a preventative action module that communicates a ranked set of recommended actions for mitigating a predicted failure of one or more of the replaceable devices, the failure predicted based on a comparison between current weighted performance and environmental measurements and the baseline correlations, wherein said modules comprise one or more of hardware circuits, a programmable hardware device and executable code, the executable code stored on one or more computer readable storage media.

2. The apparatus of claim 1, further comprising a tradeoff learning module that determines updated weighting factors based on observed changes to the performance metrics responsive to a taking of one or more recommended actions of the ranked set and communicates the updated weighting factors to the factor weighting module as part of a machine learning process cycle.

3. The apparatus of claim 2, wherein the tradeoff learning module further determines whether the taking of one or more recommended actions results in achievement of a predetermined reliability threshold.

4. The apparatus of claim 3, wherein the tradeoff learning module further communicates an instruction to the input analysis module to reset the baseline correlations responsive to the taking of the recommended actions that involve device replacement.

5. The apparatus of claim 2, wherein the recommended actions are selected from a group consisting of prompt device replacement, delayed device replacement, workload shifting within the 3D coordinate system, offloading workload, distributing workload to different data centers, distributing workload across data centers, diagnostic testing, design optimization, environmental control adjustments, and combinations thereof.

6. The apparatus of claim 2, wherein the replaceable devices comprise storage devices.

7. The apparatus of claim 6, wherein the performance metrics comprise a plurality of Self-Monitoring, Analysis and Reporting Technology ("SMART") measurements and a plurality of non-SMART performance metrics.

8. The apparatus of claim 2, wherein the environmental measurements measure parameters selected from a group consisting of mechanical vibration, acoustic noise, RF noise, temperature, humidity, magnetic interference, optical interference, solar interference from one or more of alpha particles, high-energy ions, and solar flares, and combinations thereof.

9. The apparatus of claim 2, further comprising an administration module that displays a visual map showing the device coordinate, within the 3D coordinate system, of each replaceable device of the plurality of replaceable devices for which the recommended actions are recommended.

10. The apparatus of claim 9, wherein the administration module further provides instructions to an administrator for taking the recommended actions.

11. The apparatus of claim 1, wherein the 3D coordinate system includes X and Y coordinates relative to a predetermined XY origin within the data center, and a Z coordinate related a height from a floor of the data center.

12. The apparatus of claim 1, wherein the mapping module determines the device coordinate of each replaceable device of the plurality of replaceable devices using a machine readable workbook.

13. A computer-implemented method for cognitive data center management comprising:

determining performance metrics over a predetermined time interval at a device coordinate in a three-dimensional ("3D") coordinate system for each replaceable device of a plurality of replaceable devices within a data center;

mapping the performance metrics to environmental measurements taken in the predetermined time interval at sensor coordinates in the 3D coordinate system;

using discovery analytics to determine a predicted time to failure for each replaceable device of the plurality of replaceable devices based on baseline correlations of the performance metrics and the device coordinate for each of the plurality of replaceable devices, and the environmental measurements captured at the sensor coordinates;

assigning a weighting factor to each environmental measurement ("weighted environmental measurement") and each performance metric ("weighted performance metric"); and communicating to an administrator, a ranked set of recommended actions for mitigating a predicted failure of one or more of the replaceable devices, the failure predicted based on a comparison of current weighted performance metrics and environmental measurements with the baseline correlations.

14. The computer-implemented method of claim 13, further comprising communicating updated weighting factors for assigning to each environmental measurement and each performance metrics based on observed changes to the performance metrics responsive to the taking of the one or more recommended actions of the ranked set as part of a machine learning process cycle.

15. The computer-implemented method of claim 14, further comprising communicating an instruction to reset the baseline correlations responsive to the taking of the one or more recommended actions that involve device replacement.

16. The computer-implemented method of claim 14, further comprising determining whether the taking of one or more recommended actions results in achievement of a predetermined reliability threshold.

17. The computer-implemented method of claim 13, wherein the recommended actions are selected from a group consisting of prompt device replacement, delayed device replacement, workload shifting within the 3D coordinate system, offloading workload, distributing workload to different data centers, distributing workload across data centers, diagnostic testing, design optimization, environmental control adjustments, and combinations thereof.

18. The computer-implemented method of claim 13, wherein the 3D coordinate system includes X and Y coordinates relative to a predetermined XY origin within the data center, and a Z coordinate related to a height from a floor of the data center.

19. The computer-implemented method of claim 13, further comprising determining the device coordinate of each replaceable device of the plurality of replaceable devices using a machine readable workbook.

20. A computer program product for cognitive data center management, the computer program product comprising a computer readable storage medium having program instructions embodied therewith, the program instructions executable by a processor to cause the processor to:

determine performance metrics over a predetermined time interval at a device coordinate in a three-dimensional ("3D") coordinate system for each replaceable device of a plurality of replaceable devices within a data center;

map the performance metrics to environmental measurements taken in the predetermined time interval at sensor coordinates in the 3D coordinate system;

use machine learning to determine a predicted time to failure for each replaceable device of the plurality of replaceable devices based on baseline correlations of the performance metrics and the device coordinate for each of the plurality of replaceable devices, and the environmental measurements captured at the sensor coordinates;

assign a weighting factor to each environmental measurement ("weighted environmental measurement") and each performance metric ("weighted performance metric");

communicate to an administrator, a ranked set of recommended actions for mitigating a predicted failure of one or more of the replaceable devices, the failure predicted based on a comparison between current weighted performance and environmental measurements and the baseline correlations; and provide feedback as part of a machine learning process cycle for updating the weighting factor based on the performance metrics observed in response to taking one or more of the recommended actions.

* * * * *